United States Patent
Park et al.

(10) Patent No.: US 10,627,290 B2
(45) Date of Patent: Apr. 21, 2020

(54) SPECTRAL IMAGE CORRECTING APPARATUS AND SPECTRAL IMAGE CORRECTING METHOD, AND OBJECT COMPONENT ANALYZING APPARATUS

(71) Applicant: SAMSUNG ELECTRONICS CO., LTD., Suwon-si (KR)

(72) Inventors: Yun S Park, Suwon-si (KR); Ho Jun Chang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/172,279

(22) Filed: Oct. 26, 2018

(65) Prior Publication Data
US 2019/0391015 A1     Dec. 26, 2019

(30) Foreign Application Priority Data
Jun. 20, 2018  (KR) .................. 10-2018-0070951

(51) Int. Cl.
| | | |
|---|---|---|
| G01J 3/44 | (2006.01) | |
| G01J 3/28 | (2006.01) | |
| G01N 21/65 | (2006.01) | |

(52) U.S. Cl.
CPC ........... *G01J 3/4412* (2013.01); *G01J 3/2823* (2013.01); *G01N 21/65* (2013.01); *G01J 2003/2859* (2013.01); *G01J 2003/2866* (2013.01)

(58) Field of Classification Search
CPC ...... A61B 3/0025; A61B 3/12; G02B 5/1866; H01S 5/02248; H01S 5/02415; H01S 5/02438; H01S 5/0683; H01S 5/0687; H01S 5/141; B29C 64/386; B33Y 50/02; G01B 11/0625; G01B 11/24; G01J 2003/2859; G01J 3/0297; G01J 3/28; G01J 3/42; G01J 5/0014; G01N 2021/3531; G01N 21/55; G03F 7/70483; G06T 7/514
See application file for complete search history.

(56) References Cited

U.S. PATENT DOCUMENTS

| | | |
|---|---|---|
| 6,271,914 B1 | 8/2001 | Frey et al. |
| 7,705,980 B2 | 4/2010 | Smous et al. |
| 8,355,767 B2 | 1/2013 | Hunter et al. |
| 8,460,243 B2 | 6/2013 | Goodnow et al. |
| 9,202,140 B2 | 12/2015 | Shinagawa et al. |
| 2004/0022321 A1 | 2/2004 | Satoh et al. |
| 2004/0223214 A1 | 11/2004 | Atkinson |

(Continued)

FOREIGN PATENT DOCUMENTS

JP         5424108 B2      12/2013

OTHER PUBLICATIONS

Koo, Tae-Woong, "Measurement of blood analytes in turbid biological tissue using near-infrared Raman spectroscopy", Aug. 2001, Massachusetts Institute of Technology, 261 pages total.

(Continued)

*Primary Examiner* — Abdullahi Nur
(74) *Attorney, Agent, or Firm* — Sughrue Mion, PLLC

(57) ABSTRACT

A spectral image correcting apparatus includes: an image acquirer configured to acquire a spectral image; and a processor configured to detect a peak wavelength corresponding to a characteristic wavelength based on a differential value of a spectrum of the spectral image, and correct a curvature of the spectral image based on the detected peak wavelength.

31 Claims, 17 Drawing Sheets

(56) References Cited

U.S. PATENT DOCUMENTS

2010/0226549 A1 9/2010 Smous et al.
2018/0299326 A1* 10/2018 Kitazawa .............. G01J 5/0014

OTHER PUBLICATIONS

Qi, Ji., et al., "Automated image curvature assessment and correction for high-throughput Raman spectroscopy and microscopy", 2014, Biomedical Spectroscopy and Imaging 3, p. 359-368, 10 pages total.

* cited by examiner

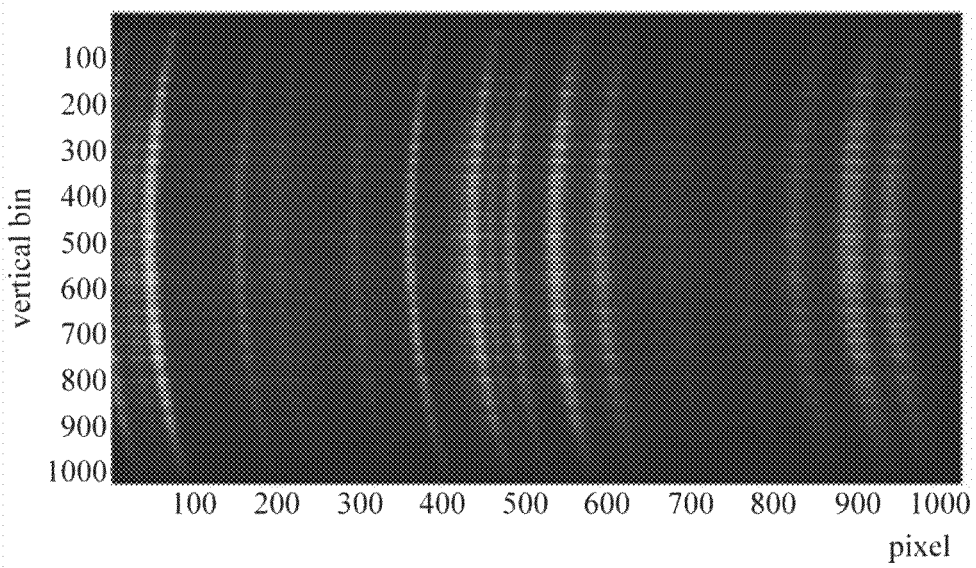

SPECTRAL IMAGE CORRECTING APPARATUS AND SPECTRAL IMAGE CORRECTING METHOD, AND OBJECT COMPONENT ANALYZING APPARATUS

CROSS-REFERENCE TO RELATED APPLICATION(S)

This application claims priority from Korean Patent Application No. 10-2018-0070951, filed on Jun. 20, 2018, in the Korean Intellectual Property Office, the disclosure of which is incorporated herein by reference in its entirety.

BACKGROUND

Field

Apparatuses and methods consistent with exemplary embodiments relate to image processing and more particularly to correcting curvature of a spectral image.

Description of the Related Art

Recently, with a growing interest in health, research is actively conducted on non-invasive techniques for analyzing components of an object. One non-invasive technique involves using Raman signals to determine the concentration of an analyte such as glucose. However, there are disadvantages in existing non-invasive methods using Raman or other types of signals, which reduce accuracy of analysis. For example, the spectral image of an object that is imaged using a spectrometer contains optical aberrations. Optical aberrations such as curvature may result in overlapping spectral bands and/or poorly resolved peaks, leading to erroneous results of analysis. In existing apparatuses using Raman spectroscopy, it may be needed to increase light collection throughput to obtain a high-quality Raman spectrum; and a method of increasing the numerical aperture (NA) and the size of a charged coupled device (CCD) is generally used for this purpose.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a spectral image correcting apparatus including: an image acquirer configured to acquire a spectral image; and a processor configured to detect a peak wavelength corresponding to a characteristic wavelength based on a differential value of a spectrum of the spectral image, and correct a curvature of the spectral image based on the detected peak wavelength.

The image acquirer may include: a light source configured to emit light onto an object; and a detector configured to acquire the spectral image based on the light scattered or reflected from the object.

The image acquirer may acquire the spectral image based on Raman spectroscopy.

The detector may include at least one of a charge-coupled device (CCD), a diode array, and a film.

The processor may include a peak detector configured to differentiate the spectrum for each row of the spectral image, and detect the peak wavelength based on the differential value of the spectrum.

The peak detector may primarily and secondarily differentiate the spectrum for each row of the spectral image, and determine a point of the spectrum, at which a primary differential value is 0 and a secondary differential value is a negative number, as corresponding to the peak wavelength.

Once the spectral image is acquired, the peak detector may select one or more characteristic wavelengths for use in correcting the curvature from an entire wavelength band of the spectrum, and wherein the selected one or more characteristic wavelengths may include the characteristic wavelength.

The peak detector may divide the spectrum into a plurality of wavelength bands, each of the plurality of wavelength bands having a corresponding characteristic wavelength of the selected one or more characteristic wavelengths, by using at least one of a low pass filter (LPF), a band pass filter (BPF), and a high pass filter (HPF), and may differentiate each of the plurality of wavelength bands to detect one peak for each of the plurality of wavelength bands.

The processor may include a curvature calculator configured to calculate the curvature for the selected one or more characteristic wavelengths based on the peak wavelength detected for the selected one or more characteristic wavelengths.

The curvature calculator may calculate the curvature for the selected one or more characteristic wavelengths by using Ordinary Least Squares regression.

The processor may further include a pixel interpolator configured to correct the curvature by performing interpolation of each pixel intensity value of the spectral image based on the curvature calculated for the selected one or more characteristic wavelengths.

According to an aspect of another exemplary embodiment, there is provided a spectral image correcting method including: acquiring a spectral image; detecting a peak wavelength corresponding to a characteristic wavelength based on a differential value of a spectrum of the spectral image; and correcting a curvature of the spectral image based on the detected peak wavelength.

The acquiring the spectral image may include acquiring the spectral image based on Raman spectroscopy.

The detecting the peak wavelength may include differentiating the spectrum for each row of the spectral image, and detecting the peak wavelength based on the differential value of the spectrum.

The detecting the peak wavelength may include primarily and secondarily differentiating the spectrum for each row of the spectral image, and determining a point of the spectrum, at which a primary differential value is 0 and a secondary differential value is a negative number, as corresponding to the peak wavelength.

The detecting the peak wavelength may include, once the spectral image is acquired, selecting one or more characteristic wavelengths for use in correcting curvature from an entire wavelength band of the spectrum, and wherein the selected one or more characteristic wavelengths may include the characteristic wavelength.

The detecting the peak wavelength may include dividing the spectrum into a plurality of wavelength bands, each of the plurality of wavelength bands having a characteristic wavelength of the selected one or more characteristic wavelengths, by using at least one of a low pass filter (LPF), a band pass filter (BPF), and a high pass filter (HPF), and differentiating each of the plurality of wavelength bands to detect one peak for each of the plurality of wavelength bands.

The correcting the curvature may include calculating the curvature for the selected one or more characteristic wavelengths based on the peak wavelength detected for the selected one or more characteristic wavelengths.

The correcting the curvature may include calculating the curvature for the characteristic wavelengths by using Ordinary Least Squares regression.

The correcting the curvature may further include correcting the curvature by performing interpolation of each pixel intensity value of the spectral image based on the curvature calculated for the selected one or more characteristic wavelengths.

According to an aspect of another exemplary embodiment, there is provided a spectral image correcting apparatus including: a communication interface connected to an external device to receive a spectral image from the external device; and a processor configured to detect a peak wavelength corresponding to a characteristic wavelength based on a differential value of a spectrum of the spectral image, and correct a curvature of the spectral image based on the detected peak wavelength.

The processor may include a peak detector configured to differentiate the spectrum for each row of the spectral image, and detect the peak wavelength based on the differential value.

The peak detector may primarily and secondarily differentiate the spectrum for each row of the spectral image, and determine a point of the spectrum, at which a primary differential value is 0 and a secondary differential value is a negative number, as corresponding to the peak wavelength.

The processor may include a curvature calculator figured to calculate the curvature for the characteristic wavelength by using Ordinary Least Squares regression based on the peak wavelength detected for the characteristic wavelength.

The processor may further include a pixel interpolator configured to correct the curvature by performing interpolation of each pixel intensity value of the spectral image based on the curvature calculated for the characteristic wavelength.

The communication interface may transmit a correction result of the curvature to the external device.

According to an aspect of another exemplary embodiment, there is provided an object component analyzing apparatus including: an image acquirer configured to acquire a spectral image; a curvature corrector configured to detect a peak wavelength corresponding to a characteristic wavelength based on a differential value with respect to a reference spectral image, and correct a curvature of the reference spectral image based on the detected peak wavelength; and a component analyzer configured to restore a spectrum by correcting a spectral image for analysis based on a correction result of the curvature of the reference spectral image, and analyze a component of an object based on the restored spectrum.

The image acquirer may acquire the spectral image based on Raman spectroscopy.

The curvature corrector may primarily and secondarily differentiate the spectrum for each row of the spectral image, and determine a point of the spectrum, at which a primary differential value is 0 and a secondary differential value is a negative number, as corresponding to the peak wavelength.

The curvature corrector may calculate the curvature for the characteristic wavelength by using Ordinary Least Squares regression based on the peak wavelength detected for the characteristic wavelength, and correct the curvature by performing interpolation of each pixel intensity value of the spectral image based on the calculated curvature.

The component analyzer may determine whether to correct the spectral image based on an analysis result of the component, and provide guide information for correcting the spectral image to a user based on a determination of whether to correct the spectral image based on the analysis result of the component.

The component the object may include at least one of blood glucose, degree of antioxidation, skin cancer, fine dust, triglycerides, calories, alcohol, cholesterol, proteins, and uric acid.

The apparatus may further include an output interface configured to output the analysis result of the component.

The apparatus may further include a storage configured to store at least one of the correction result of the curvature of the reference spectrum and an analysis result of the component.

BRIEF DESCRIPTION OF THE DRAWINGS

The above and/or other aspects will be more apparent by describing certain exemplary embodiments, with reference to the accompanying drawings, in which:

FIGS. 5A to 5H are diagrams explaining an example of correcting curvature of a spectral image;

DETAILED DESCRIPTION

Figure 1:
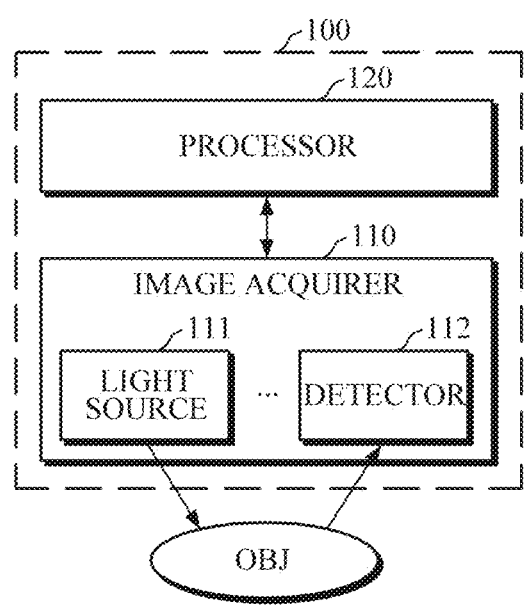
FIG. 1 is a block diagram illustrating a spectral image correcting apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'part' or 'module', etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Various embodiments of the spectral image correcting apparatus may be embedded in a mobile wearable device, a smart device, and the like. Examples of the spectral image correcting apparatus may include, but are not limited to, a wearable device manufactured in various types such as a smart watch worn on the wrist, a smart band-type wearable device, a headphone-type wearable device, a hairband-type wearable device, and the like, or a mobile device such as a smartphone, a table PC, and the like.

FIG. 1 is a block diagram illustrating a spectral image correcting apparatus according to an exemplary embodiment.

Referring to FIG. 1, the spectral image correcting apparatus 100 includes an image acquirer 110 and a processor 120.

The image acquirer 110 may acquire a spectral image of an object OBJ. The image acquirer 110 may be an image acquiring sensor based on Raman spectroscopy (e.g., a spectrometer), and may include a light source 111 and a detector 112. However, the image acquirer 110 is not limited to the Raman spectroscopy, and may acquire a spectral image by various spectroscopic methods such as near-infrared spectroscopy and the like.

The light source 111 may emit light onto a reference object OBJ to correct light aberration (e.g., curvature) of a spectral image. The light source 111 may include a light emitting diode (LED), a laser diode, and a fluorescent body, and the like. The light source 111 may be formed in one or a plurality of arrays. The light source 111 may be configured to emit monochromatic laser light to acquire a spectral image using Raman spectroscopy.

The detector 112 may detect light (hereinafter referred to as "scattered light") which is emitted by the light source 111 and is scattered/reflected from the object. The detector 112 may include a charge-coupled device (CCD), a diode array, a film, and the like, which include multiple pixels.

Figure 2A:
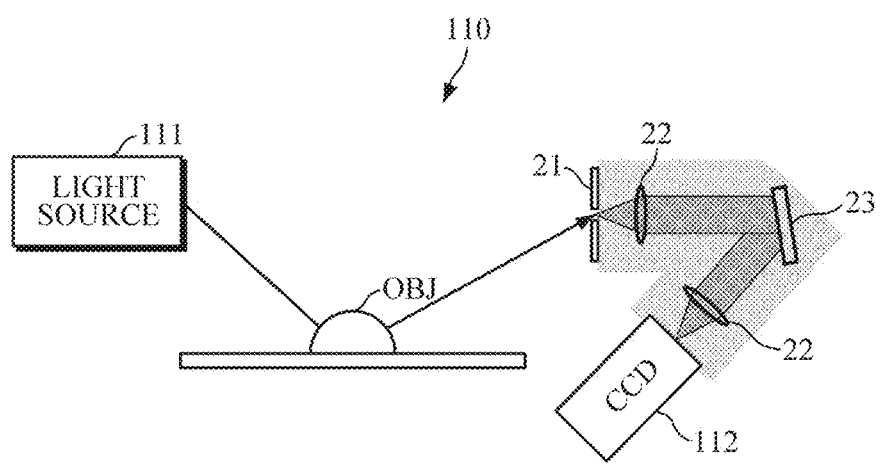
FIGS. 2A and 2B are diagrams schematically illustrating an example of an image acquirer to explain acquiring of a spectral image.
Figure 2B:
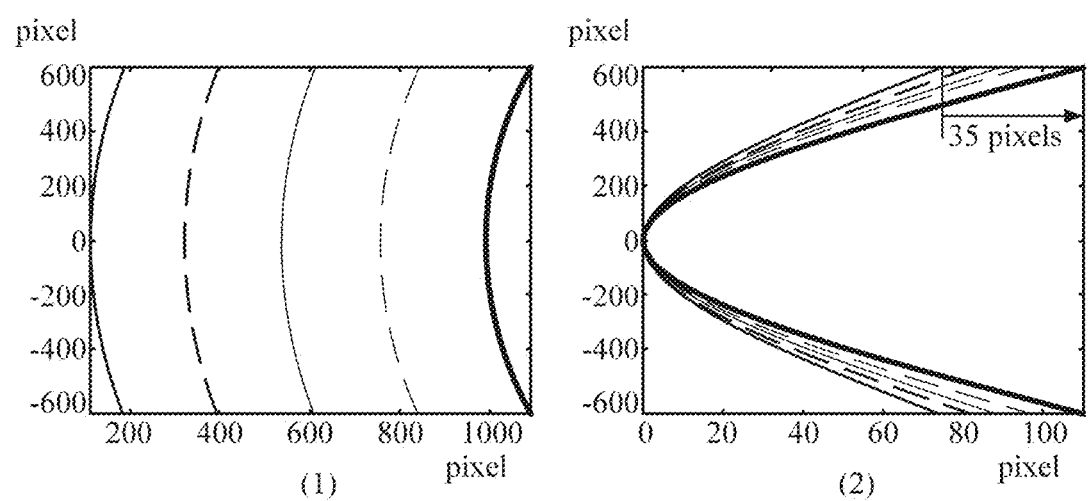

FIGS. 2A and 2B are diagrams schematically illustrating an example of an image acquirer to explain acquiring of a spectral image.

Referring to FIG. 2A, laser light emitted by the light source 111 is incident on an object OBJ. The light incident on the object OBJ is scattered from components within the object OBJ, and the scattered light passes through a slit 21, to be detected by a CCD detector 112. The width of the slit 21 may be adjusted to allow adjustment of resolution. In this case, light having passed through the slit 21 passes through a lens 22, and the direction of the light is changed by the mirror 23, such that the light may enter the CCD detector 112.

Referring to FIG. 2B, graph (1) illustrates a spectral image restored by the CCD detector 112. Raman light is detected as a function of intensity and wavelength, to be restored to a spectral image. Here, an X axis is a row direction of the CCD detector 112 and indicates the height of the slit 21; and a Y axis is a column direction of the CCD detector 112 and indicates a wavelength. In graph (1) of FIG. 2B, spectral lines of the spectral image have a uniform curvature value, while in graph (2), the spectral lines have different curvature values.

Generally, the spectral image restored by the detector 112 may include optical anomalies. The optical anomalies, such as curvature and the like, may result in overlapping spectral bands and/or insufficient separation of peaks, which reduces accuracy of analyzing components of an object.

The processor 120 may correct the curvature of the acquired spectral image. The processor 120 may correct the curvature of the spectral image using software. For example, with respect to the spectral image, the processor 120 may detect peaks for characteristic wavelengths based on characteristics of a differential value. In this case, the characteristic wavelength may refer to a wavelength corresponding to a spectral line to be used for correcting the curvature in the spectral image.

In addition, the processor 120 may correct the curvature of the spectral image by adjusting a pixel intensity using peak information detected for each characteristic wavelength. In this case, by using the peak information and Ordinary Least Square regression, the processor 120 may calculate the curvature of a spectral line corresponding to each characteristic wavelength, and may correct the curvature of the spectral image by using the calculated curvature information..

Figure 3:
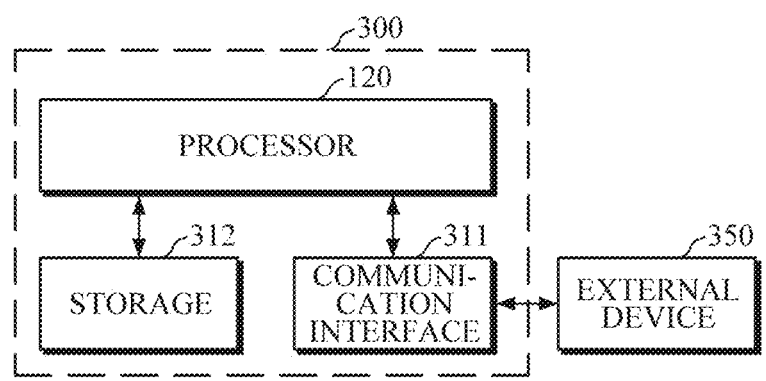
FIG. 3 is a block diagram illustrating a spectral image correcting apparatus according to another exemplary embodiment.

FIG. 3 is a block diagram illustrating spectral image correcting apparatus according to another exemplary embodiment.

Referring to FIG. 3, the spectral image correcting apparatus 300 includes a communication interface 311 and a storage 312 in addition to the processor 120. In the exemplary embodiment, the spectral image correcting apparatus 300 may not require a sensor for acquiring an image, and thus may be manufactured in a compact size.

Once the communication interface 311 receives a spectral image from an external device 350, the processor 120 may correct curvature of the spectral image based on the characteristics of a derivative value and/or Ordinary Least Square regression with respect to the spectral image.

The communication interface 311 may receive a spectral image and/or a request for correcting a spectral image from the external device 350. The external device 350 may include a Raman spectroscopic sensor for acquiring a Raman spectral image, an information processing device such as a smartphone, a tablet PC, and a desktop computer, a healthcare device and the like. Further, the communication interface 311 may transmit a processing result (e.g., a correction result of the spectral image) of the processor 120 to the external device 350.

In particular, the communication interface 311 may perform communication by using communication techniques such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G communication, 4G communication, 5G communication, and the like, but is not limited thereto.

The storage 312 may store various types of information including the spectral image received from the external device 350. For example, the storage 312 may include user information such as a user's age, gender, health state, and the like. Further, the storage 350 may store a processing result of the processor 120. For example, the storage 350 may store a correction result of the curvature such as a calculated curvature value of the spectral image and the like.

In particular, the storage 312 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

Figure 4:
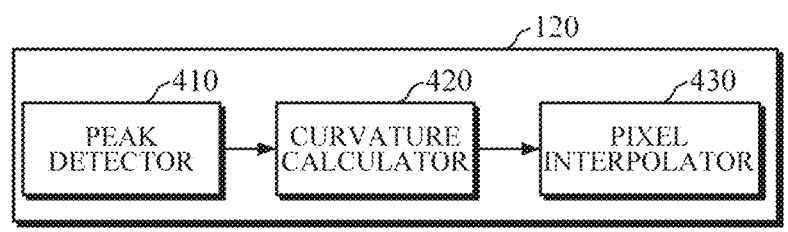
FIG. 4 is a block diagram illustrating a configuration of processors of FIGS. 1 and 3.

FIG. 4 is a block diagram illustrating a configuration of processors of FIGS. 1 and 3. FIGS. 5A to 5H are diagrams explaining an example of correcting curvature of a spectral image. By referring to FIGS. 4 to 5H, an example of correcting a spectral image according to an exemplary embodiment will be described below.

Referring to FIG. 4, the processor 120 includes a peak detector 410, a curvature calculator 420, and a pixel interpolator 430.

Figure 5B:
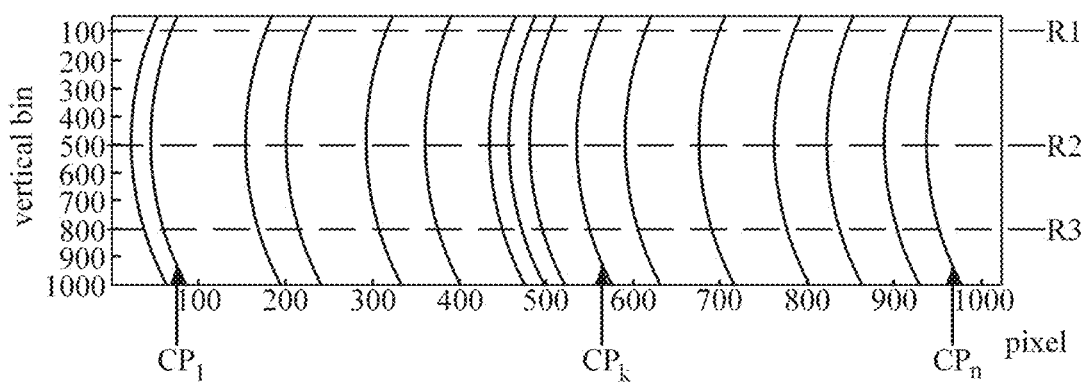

The peak detector 410 may select one or more characteristic wavelengths for use in correcting curvature from a raw spectral image. For example, FIG. 5A illustrates a raw spectral image, of which curvature is to be corrected; and FIG. 5B illustrates three characteristic wavelengths $CP_1$, $CP_k$, and $CP_n$ for use in correcting the curvature of the raw spectral image.

The peak detector 410 may differentiate a spectrum sequentially for each of the rows of a spectral image or for at least some selected rows, and may detect a peak for each row with respect to characteristic wavelengths based on a differential value. FIG. 5B illustrates three selected rows R1, R2, and R3.

Figure 5C:
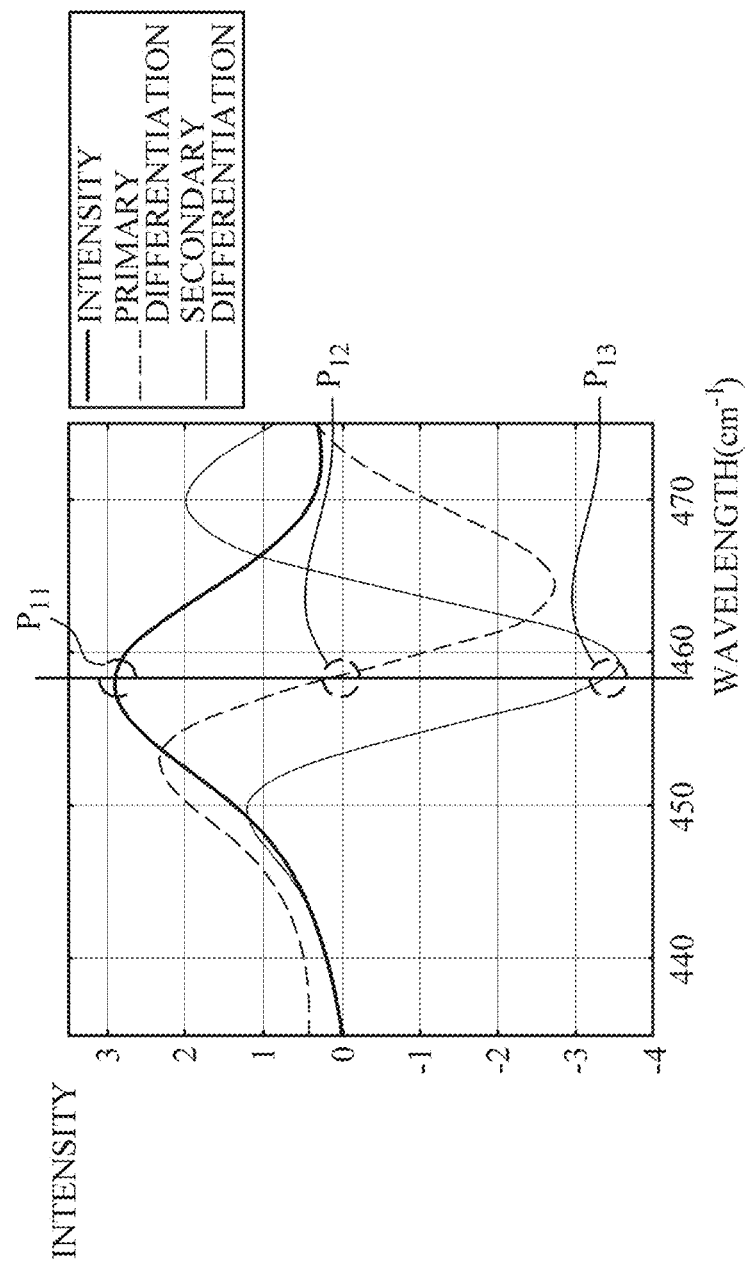

In addition, the peak detector 410 may divide the spectrum into unit bands each having a characteristic wavelength. The term "unit band" may be also referred to as a wavelength band. For example, the peak detector 410 may divide the spectrum into unit bands, each having a characteristic wavelength, by using at least one of a low pass filter (LPF), a band pass filter (BPF), and a high pass filter (HPF). FIG. 5C illustrates one band of the spectrum for a specific row of the spectral image, in which the spectrum band has, for example, a predetermined characteristic wavelength of 460 cm$^{-1}$.

The peak detector 410 may differentiate a spectrum of each band, and may determine a peak for a characteristic wavelength based on a differential value. For example, the peak detector 410 may primarily and secondarily differentiate the spectrum for each row of the spectral image, and may determine a point of the spectrum, at which a primary differential value is 0 and a secondary differential value is a negative number, to be a peak of a characteristic wavelength for the row. For example, referring to FIG. 5C, the peak detector 410 may determine a wavelength (e.g., about 458 cm$^{-1}$) at a point $P_{11}$ of the spectrum, at which a primary differential value $P_{12}$ is 0 and a secondary differential value $P_{13}$ is a negative number, to be a peak of the characteristic wavelength of 460 cm$^{-1}$. In this manner, the peak detector 410 may determine peaks of the selected characteristic wavelengths for each row of the spectral image.

Figure 5D:
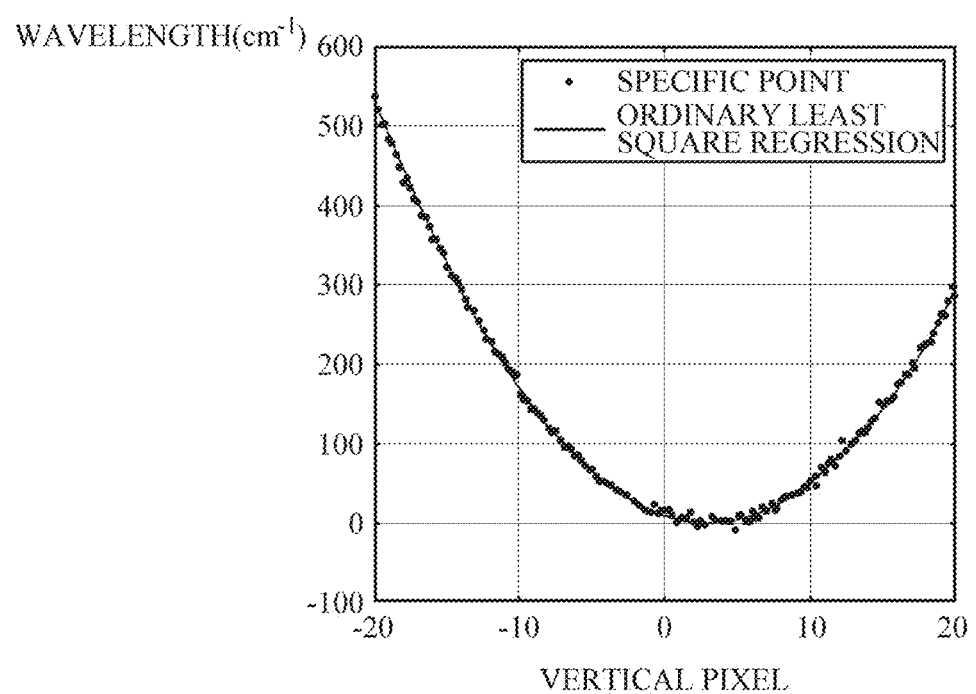
Figure 5E:
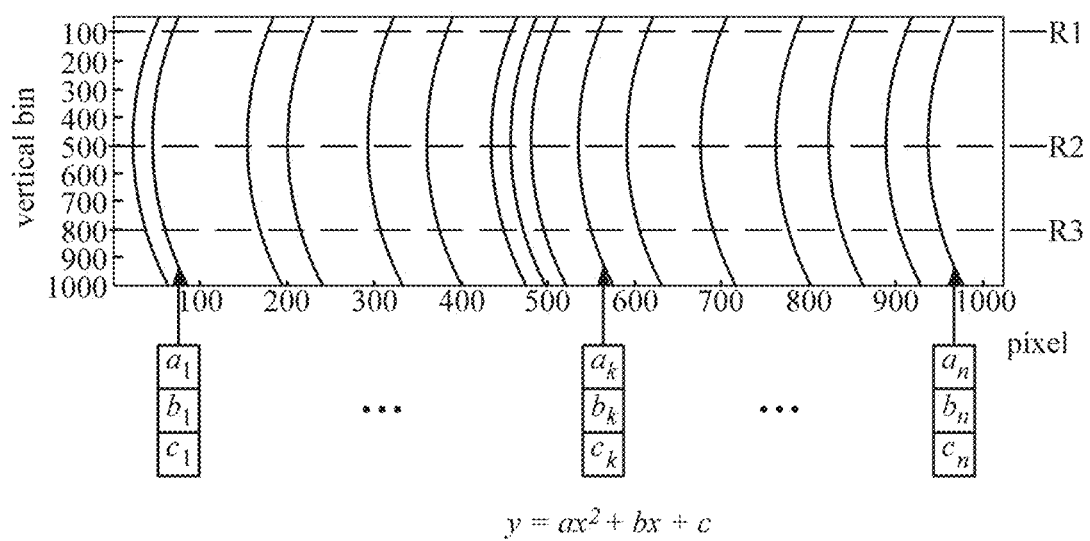

The curvature calculator 420 may calculate curvature for each characteristic wavelength by using peaks for each row at each of the characteristic wavelengths selected by the peak detector 410. For example, the curvature calculator 420 may calculate the curvature for each characteristic wavelength by using Ordinary Least Squares regression. FIG. 5D illustrates a parabola of curvature for a predetermined characteristic wavelength, which is obtained by plotting a wavelength of a peak for each row with respect to a spectral image.

Referring to FIGS. 5B to 5E, the curvature calculator 420 may calculate curvature for a spectral line of each characteristic wavelength by determining a coefficient of Ordinary Least Squares regression, represented by the following Equation 1, based on peaks detected for at least three rows R1, R2, and R3 with respect to characteristic wavelengths $CP_1$, $CP_k$, and $CP_n$.

For example, assuming that the first characteristic wavelength $CP_1$ is 100 cm$^{-1}$, the values of the three rows R1, R2, and R3 are 100, 500, and 800, and the peak wavelengths detected for the three rows R1, R2, and R3 are 80, 70, and 98, the curvature calculator 420 may calculate coefficients $a_1$, $b_1$, and $c_1$ for the first characteristic wavelength $CP_1$ by substituting the value of each row and a characteristic wavelength corresponding to the row in Equation 1. The values 100, 500, and 800 may indicate vertical bin values (i.e., the pixel numbers in the, y-axis in the pixel array of the detector). In this manner, the curvature calculator 420 may calculate coefficients $a_k$, $b_k$, and $c_k$ for the characteristic wavelength $CP_k$, and coefficients $a_n$, $b_n$, and $c_n$ for the characteristic wavelength $CP_n$.

$$y = ax^2 + bx + c \quad \text{[Equation 1]}$$

Herein, x denotes a value of a specific row of the spectral image, and y denotes a peak wavelength detected for the row x.

The pixel interpolator 430 may correct curvature of the entire spectral image based on curvature information calculated for each characteristic wavelength by the curvature calculator 420. The pixel interpolator 430 may stand the spectral line of each characteristic wavelength vertically upright by performing interpolation in which a pixel intensity value is adjusted for each characteristic wavelength. Further, based on the curvature information calculated for each characteristic wavelength, the pixel interpolator 430 may correct the curvature of the entire spectral image by performing pixel interpolation for adjacent wavelengths.

Figure 5F:
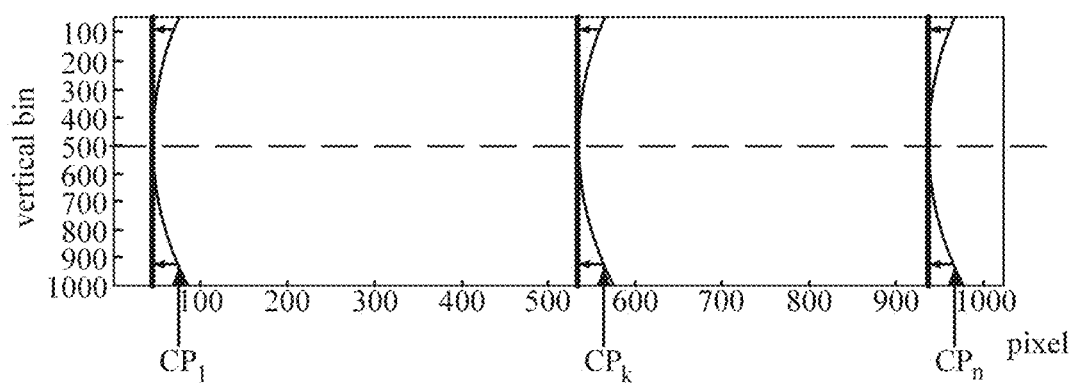

For example, referring to FIG. 5F, assuming that a specific row, e.g., a center row 500, of the spectral image is the center of the spectrum, the pixel interpolator 430 may adjust intensity of each pixel based on the center row 500 so that the spectral lines of the characteristic wavelengths $CP_1$, $CP_k$, and $CP_n$ may be vertically upright. However, the pixel interpolator 430 is not limited thereto, and may perform vertical binning not necessarily based on the center row but on any row.

Figure 5G:
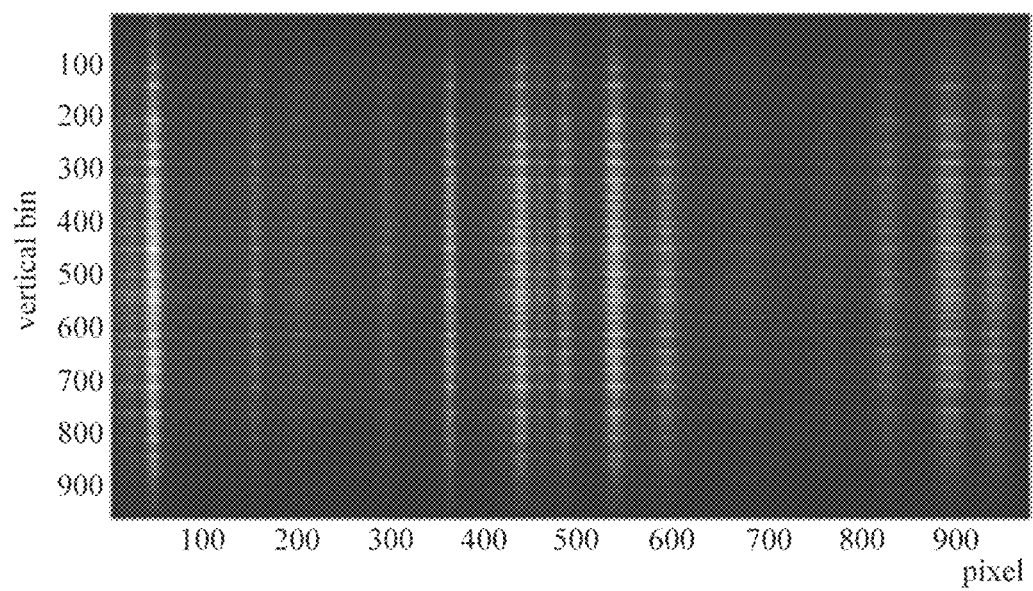
Figure 5H:
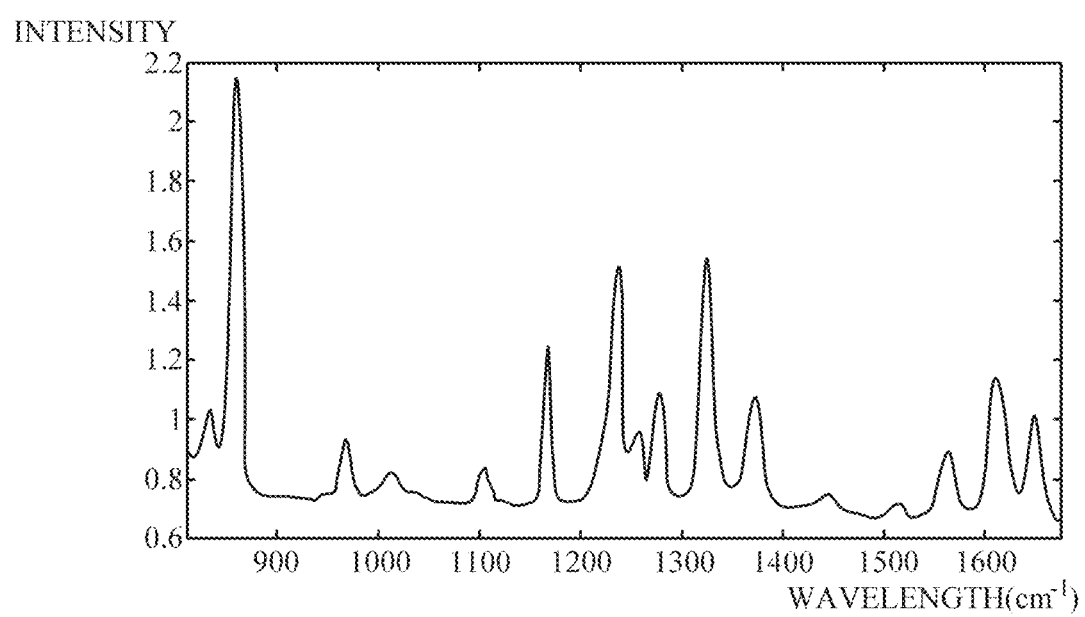

FIG. 5G illustrates a corrected spectral image, of which the spectral lines are vertically upright by correcting the curvature as described above. FIG. 5H illustrates an example of restoring a spectrum based on the corrected spectral image. In the exemplary embodiment, peaks for characteristic wavelengths may be detected from the spectral image based on differential values. Further, by individually calculating the curvature of the spectral line for each of the characteristic wavelengths based on Ordinary Least Square regression, vertical binning may be performed based on any row other than a center row of the spectral image, even in the case of misalignment.

According to an exemplary embodiment, a detection of peak wavelength may be performed on all the rows in the pixel array, and all or at least three rows may be used for the curvature calculation for the detected characteristic wavelength.

Figure 6:
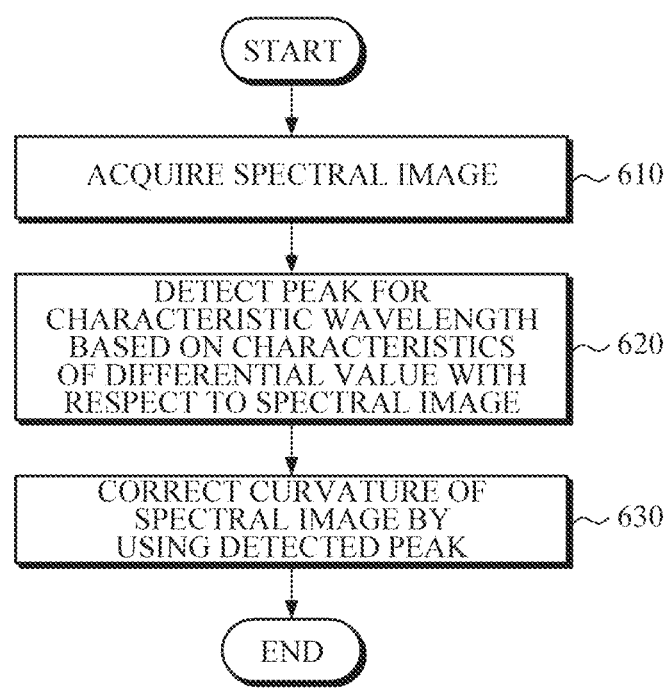
FIG. 6 is a flowchart illustrating a spectral image correcting method according to an exemplary embodiment.

FIG. 6 is a flowchart illustrating a spectral image correcting method according to an exemplary embodiment.

The spectral image correcting method of FIG. 6 is an example of a spectral image correcting method performed by the spectral image correcting apparatuses 100 and 300 of FIGS. 1 and 3 according to an exemplary embodiment.

Referring to FIG. 6, the spectral image correcting apparatus 100, 300 may acquire a spectral image in response to a request for correcting a spectral image in operation 610. The request for correcting a spectral image may be input by a user or may be received from an external device. For example, upon receiving the request for correcting a spectral image, the spectral image correcting apparatus 100, 300 may acquire a raw spectral image by driving a Raman spectroscopy-based image acquiring sensor mounted therein.

Then, the spectral image correcting apparatus 100, 300 may detect a peak for a predetermined characteristic wavelength with respect to the spectral image based on characteristics of a differential value in operation 620.

The spectral image correcting apparatus 100, 300 may select one or more characteristic wavelengths for use in correcting curvature from the raw spectral image. Further, the spectral image correcting apparatus 100, 300 may differentiate a spectrum for each row of the spectral image, and may detect peaks for one or more selected characteristic wavelengths based on the differential value. In particular, upon selecting the one or more characteristic wavelengths, the spectral image correcting apparatus 100, 300 may divide the spectrum into unit bands each having a characteristic wavelength, may differentiate the spectrum of each band, and may determine peaks for characteristic wavelengths based on the differential value.

The spectrum image correcting apparatus 100, 300 may primarily and secondarily differentiate the spectrum for each row of the spectral image, and may determine a point of the spectrum, at which a primary differential value is 0 and a secondary differential value is a negative number, to be a peak of a characteristic wavelength for the row.

Subsequently, the spectrum image correcting apparatus may correct curvature of the spectral image by using the detected peaks in operation 630.

For example, by using peaks detected for each row with respect to a specific characteristic wavelength, the spectral image correcting apparatus 100, 300 may calculate curvature for the characteristic wavelength. In particular, the spectral image correcting apparatus 100, 300 may calculate the curvature for each characteristic wavelength by using Ordinary Least Square regression.

In addition, upon calculating the curvature of a spectrum line for each characteristic wavelength, the spectral image correcting apparatus 100, 300 may correct the curvature of the entire spectral image based on the calculated curvature information. For example, by performing interpolation of a pixel intensity value for each characteristic wavelength, the spectral image correcting apparatus 100, 300 may perform vertical binning to stand the spectral lines of each characteristic wavelength vertically upright. Moreover, the spectral image correcting apparatus 100, 300 may correct the curvature of the entire spectral image by performing pixel interpolation for adjacent wavelengths based on the curvature information calculated for each characteristic wavelength.

Hereinafter, an object component analyzing apparatus and object component analyzing method will be described in detail with reference to the accompanying drawings. Various embodiments of the object component analyzing apparatus and object component analyzing method may be embedded in a mobile wearable device, a smart device, and the like. Examples of the device may include a wearable device manufactured in various types, such as a smart watch worn on the wrist, a smart band-type wearable device, a headphone-type wearable device, a hairband-type wearable device, and the like, or a mobile device such as a smartphone, a table PC, and the like, but the device is not limited thereto.

Figure 7:
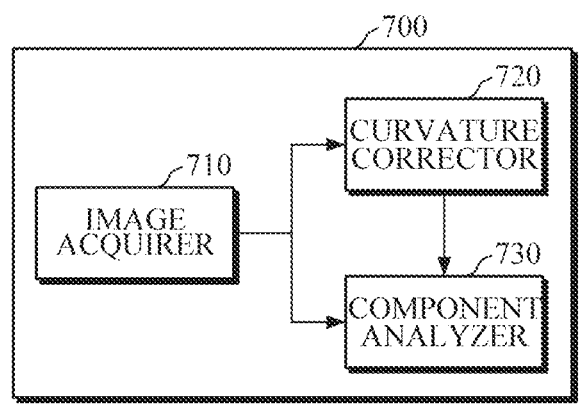
FIG. 7 is a block diagram illustrating an object component analyzing apparatus according to an exemplary embodiment.

FIG. 7 is a block diagram illustrating an object component analyzing apparatus 700 according to an embodiment of the present disclosure.

Referring to FIG. 7, the object component analyzing apparatus 700 includes an image acquirer 710, a curvature corrector 720, and a component analyzer 730. The curvature corrector 720 and the component analyzer 730 may be included in one processor or may be included in two or more processors separately.

The image acquirer 710 may acquire a Raman spectral image by using Raman spectroscopy. However, the image acquirer 710 is not limited to the Raman spectroscopy, and may acquire spectral images by using various spectroscopic methods such as near-infrared spectroscopy and the like. For example, the image acquirer 710 may include a light source for emitting light onto an object and a detector for acquiring a spectral image by detecting light scattered from the object. The light source may be one or more in number, and may include an LED, LD, and the like. The detector may include a CCD, a diode array, and the like, which include multiple pixels.

The curvature corrector 720 may correct curvature of a spectral image by using a reference spectral image acquired from a reference object. A process of correcting the curvature by using the reference spectral image may be performed at the time of manufacturing the object component analyzing apparatus 700.

The curvature corrector 720 may select one or more characteristic wavelengths for use in correcting the curvature from the reference spectral image. The curvature corrector 720 may divide the spectrum into wavelength bands each having a characteristic wavelength.

The curvature corrector 720 may differentiate the spectrum for each row of the spectral image, and may determine peaks for one or more characteristic wavelengths for use in correcting curvature of the spectral image based on characteristics of the differential value. For example, the curvature corrector 720 may primarily and secondarily differentiate the spectrum for each row of the spectral image, and may determine a point of the spectrum, at which a primary differential value is 0 and a secondary differential value is a negative number, to be a peak of a characteristic wavelength for the row.

By using peaks for each row with respect to each characteristic wavelength the curvature corrector 720 may calculate curvature for each characteristic wavelength. For example, the curvature corrector 720 may calculate the curvature for each characteristic wavelength by using Ordinary Least Square regression.

The curvature corrector 720 may correct curvature of the entire spectral image based on curvature information calculated for each characteristic wavelength. The curvature corrector 720 may stand the spectral line of each characteristic wavelength vertically upright by performing interpolation in which a pixel intensity value is adjusted for each characteristic wavelength. Further, based on the curvature information calculated for each characteristic wavelength, the curvature corrector 720 may correct the curvature of the entire spectral image by performing pixel interpolation for adjacent wavelengths.

Upon receiving a request for analyzing components of an object, e.g., human skin, the component analyzer 730 may drive the image acquirer 710, and may receive a spectral image for analysis, to be used for analyzing components of the object, from the image acquirer 710. The request for analyzing components of the object may be input by a user. Alternatively, in the case where an analysis interval is set, the component analyzer 730 may automatically determine that the request for analyzing components of the object is received at the set analysis interval.

Upon receiving the spectral image for analysis, the component analyzer 730 may correct the received spectral image for analysis based on a correction result of curvature of a reference spectral image.

The component analyzer 730 may restore a spectrum using the corrected spectral image for analysis, and may analyze components of the object by using the restored spectrum. The component analyzer 730 may measure the concentration of a target component based on absorbance of the restored spectrum and a pre-defined component estimation model. In particular, examples of the components of the object may include blood glucose, degree of antioxidation, skin cancer, fine dust, triglycerides, calories, alcohol, cholesterol, proteins, uric acid, and the like.

In addition, the component analyzer 730 may determine whether to correct the spectral image based on a component analysis result. In this case, criteria for correcting the spectral image may be predetermined. For example, in the case of measuring blood glucose level, when a concentration of the measured blood glucose level falls outside a pre-defined normal blood glucose range, and the measured blood glucose level falls outside the pre-defined normal blood glucose range a number of times which is equal to or greater than a predetermined number of times, the component analyzer 730 may determine to re-correct the spectral image. Various criteria for correcting the spectral image may bet set, and the criteria is not limited to the above example. Upon determining that it is required to correct the spectral image, the component analyzer 730 may provide guide information for correcting a spectral image to a user.

Figure 8:
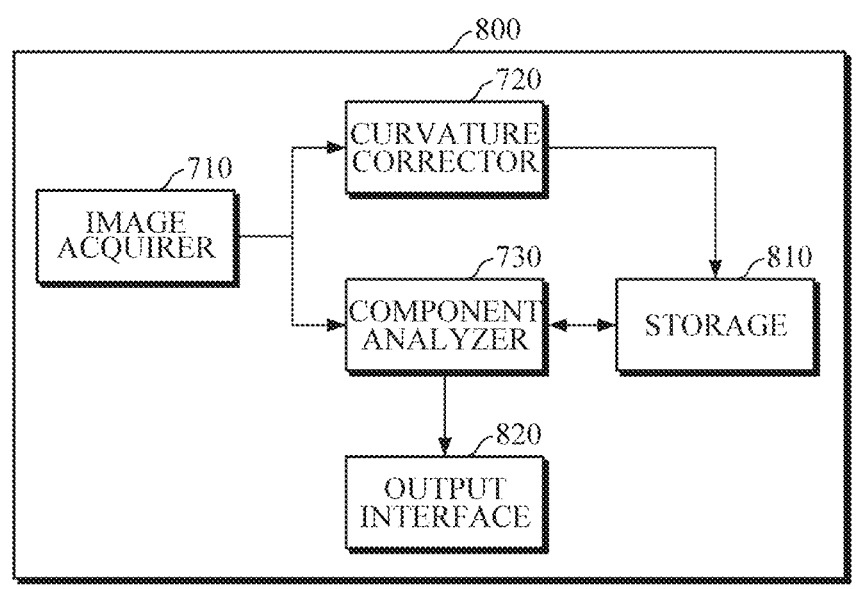
FIG. 8 is a block diagram illustrating an object component analyzing apparatus according to another exemplary embodiment.

FIG. 8 is a block diagram illustrating an object component analyzing apparatus according to another exemplary embodiment.

Referring to FIG. 8, the object component analyzing apparatus 800 includes an image acquirer 710, a curvature corrector 720, a component analyzer 730, a storage 810, and an output interface 820. The image acquirer 710, the curvature corrector 720, and the component analyzer 730 are described above in detail.

The storage 810 may store various types of criteria information. For example, the criteria information may include an object component measuring model, a component measuring period, and user information such as a user's age, gender, health state, and the like. Further, the storage 810 may store a processing result, e.g., a curvature correction result, of the curvature corrector 720. In addition, the storage 810 may store a component analysis result of the component analyzer 820.

In particular, the storage 810 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read. Only Memory (EEPROM), a Programmable Read Only Memory (PROM), a magnetic memory, a magnetic disk, and an optical disk, and the like, but is not limited thereto.

The output interface 820 may output a processing result of the component analyzer 730 to a user. For example, the output interface 820 may visually or non-visually provide concentration information of the measured object component a user. In addition, the output interface 820 may output health state monitoring information of a user along with the concentration information. In this case, the output interface 820 may provide the concentration information to a user by changing the color of component concentration values output to a display or through tactility, vibration, or the like using a haptic module. Once the component analyzer 730 determines to re-correct a spectral image, the output interface 820 may output guide information indicating that it is required to re-correct the spectral image.

Figure 9:
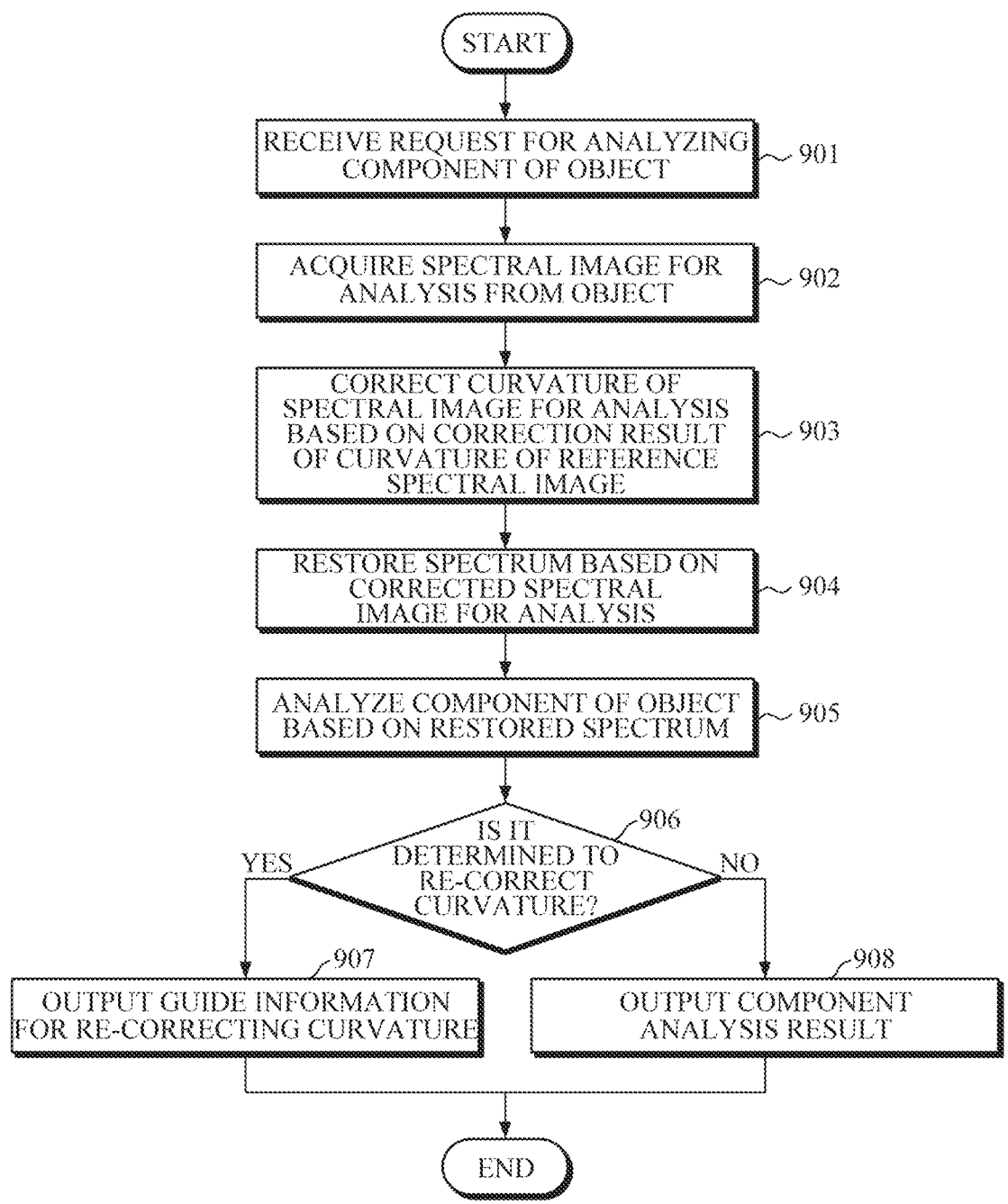
FIG. 9 is a flowchart illustrating an object component analyzing method according to an exemplary embodiment.

FIG. 9 is a flowchart illustrating an object component analyzing method according to an exemplary embodiment.

The object component analyzing method of FIG. 9 may be an example of an object component analyzing method performed by the object component analyzing apparatuses 700 and 800.

Referring to FIG. 9, the object component analyzing apparatuses 700 and 800 may receive a request for analyzing components of an object in operation 901. For example, the object component analyzing apparatuses 700 and 800 may receive a request for analyzing components of an object from a user. In another example, the object component analyzing apparatuses 700 may automatically determine that the request for analyzing components of an object is received at predetermined intervals.

Then, the object component analyzing apparatuses 700 and 800 may acquire a spectral image for analysis from an object in operation 902 (e.g., a skin tissue of a user) of which component is to be analyzed. In this case, the spectral image may be a Raman spectral image.

Subsequently, the object component analyzing apparatuses 700 and 800 may correct curvature of the spectral image for analysis based on a correction result of curvature of a reference spectral image in operation 903. In this case, the curvature correction using the reference spectral image may be performed at the time of manufacturing the initial apparatus, at predetermined intervals, or at the request of a user. The curvature correction of the reference spectral image may be performed using software. For example, the object component analyzing apparatuses 700 and 800 may detect peaks for characteristic wavelengths for use in correcting curvature from the reference spectral image based on characteristics of a differential value, and may correct curvature of the entire spectral image by calculating curvature using the detected peaks and by performing interpolation of a pixel intensity value.

Next, the object component analyzing apparatuses 700 and 800 may restore a spectrum based on the analysis spectral image in operation 904, of which curvature is corrected, and may analyze components of the object by using the restored spectrum in operation 905. For example, the object component analyzing apparatuses 700 and 800 may measure a component concentration by using spectral absorbance and a pre-defined component measuring model.

Then, the object component analyzing apparatuses 700 and 800 may determine whether to re-correct curvature based on an analysis result of object components in operation 906. For example, in the case where a concentration of the currently measured component level falls outside a predetermined normal range, and the measured component concentration level falls outside the predetermined normal range for a predetermined period of time a number of times which is greater than a threshold, the object component analyzing apparatuses 700 and 800 may determine that it is required to re-correct the curvature.

Subsequently, upon determining that it is required to re-correct the curvature in operation 906, the object component analyzing apparatuses 700 and 800 may output guide information indicating that it is required to re-correct the spectral image in operation 907. For example, the object component analyzing apparatuses 700 and 800 may visually display information, such as "it is required to correct curvature of the spectral image", on a display, or may convert the information into a voice signal and may output the information through voice using a speaker module.

Upon determining that it is not required to re-correct the curvature in operation 906, the object component analyzing apparatuses 700 and 800 may output a component analysis result in operation 908. The component analysis result may be output in a visual and/or non-visual manner. For example, in the case where a component concentration falls outside a normal range, the object component analyzing apparatuses 700 and 800 may display the information in red, to visually notify a user that the component concentration is not in a normal range. Alternatively, in the case where a haptic module is mounted or connected, the object component analyzing apparatuses 700 and 800 may notify that there is abnormality in the measured component concentration through vibration or tactility using the haptic module.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spectral image correcting apparatus comprising:
an image acquirer configured to acquire a spectral image; and
a processor configured to detect a peak wavelength corresponding to a characteristic wavelength based on a differential value of a spectrum of the spectral image, and correct a curvature of the spectral image based on the detected peak wavelength.

2. The apparatus of claim 1, wherein the image acquirer comprises:
a light source configured to emit light onto an object; and
a detector configured to acquire the spectral image based on the light scattered or reflected from the object.

3. The apparatus of claim 2, wherein the image acquirer acquires the spectral image based on Raman spectroscopy.

4. The apparatus of claim 2, wherein the detector comprises at least one of a charge-coupled device (CCD), a diode array, and a film.

5. The apparatus of claim 1, wherein the processor comprises a peak detector configured to differentiate the spectrum for each row of the spectral image, and detect the peak wavelength based on the differential value of the spectrum.

6. The apparatus of claim 5, wherein the peak detector primarily and secondarily differentiates the spectrum for each row of the spectral image, and determines a point of the spectrum, at which a primary differential value is 0 and a secondary differential value is a negative number, as corresponding to the peak wavelength.

7. The apparatus of claim 5, wherein once the spectral image is acquired, the peak detector selects one or more characteristic wavelengths for use in correcting the curvature from an entire wavelength band of the spectrum, and
wherein the selected one or more characteristic wavelengths comprise the characteristic wavelength.

8. The apparatus of claim 7, wherein the peak detector divides the spectrum into a plurality of wavelength bands, each of the plurality of wavelength bands having a corresponding characteristic wavelength of the selected one or more characteristic wavelengths, by using at least one of a low pass filter (LPF), a band pass filter (BPF), and a high pass filter (HPF), and differentiates each of the plurality of wavelength bands to detect one peak for each of the plurality of wavelength bands.

9. The apparatus of claim 5, wherein the processor comprises a curvature calculator configured to calculate the curvature for the selected one or more characteristic wavelengths based on the peak wavelength detected for the selected one or more characteristic wavelengths.

10. The apparatus of claim 9, wherein the curvature calculator calculates the curvature for the selected one or more characteristic wavelengths by using Ordinary Least Squares regression.

11. The apparatus of claim 9, wherein the processor further comprises a pixel interpolator configured to correct the curvature by performing interpolation of each pixel intensity value of the spectral image based on the curvature calculated for the selected one or more characteristic wavelengths.

12. A spectral image correcting method comprising:
acquiring a spectral image;
detecting a peak wavelength corresponding to a characteristic wavelength based on a differential value of a spectrum of the spectral image; and
correcting a curvature of the spectral image based on the detected peak wavelength.

13. The method of claim 12, wherein the acquiring the spectral image comprises acquiring the spectral image based on Raman spectroscopy.

14. The method of claim 12, wherein the detecting the peak wavelength comprises differentiating the spectrum for each row of the spectral image, and detecting the peak wavelength based on the differential value of the spectrum.

15. The method of claim 14, wherein the detecting the peak wavelength comprises primarily and secondarily differentiating the spectrum for each row of the spectral image, and determining a point of the spectrum, at which a primary differential value is 0 and a secondary differential value is a negative number, as corresponding to the peak wavelength.

16. The method of claim 14, wherein the detecting the peak wavelength comprises, once the spectral image is acquired, selecting one or more characteristic wavelengths for use in correcting curvature from an entire wavelength band of the spectrum, and wherein the selected one or more characteristic wavelengths comprise the characteristic wavelength.

17. The method of claim 16, wherein the detecting the peak wavelength comprises dividing the spectrum into a plurality of wavelength bands, each of the plurality of wavelength bands having a characteristic wavelength of the selected one or more characteristic wavelengths, by using at least one of a low pass filter (LPF), a band pass filter (BPF), and a high pass filter (HPF), and differentiating each of the plurality of wavelength bands to detect one peak for each of the plurality of wavelength bands.

18. The method of claim 16, wherein the correcting the curvature comprises calculating the curvature for the selected one or more characteristic wavelengths based on the peak wavelength detected for the selected one or more characteristic wavelengths.

19. The method of claim 18, wherein the correcting the curvature comprises calculating the curvature for the characteristic wavelengths by using Ordinary Least Squares regression.

20. The method of claim 18, wherein the correcting the curvature further comprises correcting the curvature by performing interpolation of each pixel intensity value of the spectral image based on the curvature calculated for the selected one or more characteristic wavelengths.

21. A spectral image correcting apparatus comprising:
a communication interface connected to an external device to receive a spectral image from the external device; and
a processor configured to detect a peak wavelength corresponding to a characteristic wavelength based on a differential value of a spectrum of the spectral image, and correct a curvature of the spectral image based on the detected peak wavelength.

22. The apparatus of claim 21, wherein the processor comprises a peak detector configured to differentiate the spectrum for each row of the spectral image, and detect the peak wavelength based on the differential value.

23. The apparatus of claim 22, wherein the peak detector primarily and secondarily differentiates the spectrum for each row of the spectral image, and determines a point of the spectrum, at which a primary differential value is 0 and a secondary differential value is a negative number, as corresponding to the peak wavelength.

24. The apparatus of claim 21, wherein the processor comprises a curvature calculator configured to calculate the curvature for the characteristic wavelength by using Ordinary Least Squares regression based on the peak wavelength detected for the characteristic wavelength.

25. The apparatus of claim 24, wherein the processor further comprises a pixel interpolator configured to correct the curvature by performing interpolation of each pixel intensity value of the spectral image based on the curvature calculated for the characteristic wavelength.

26. An object component analyzing apparatus comprising:
an image acquirer configured to acquire a spectral image;
a curvature corrector configured to detect a peak wavelength corresponding to a characteristic wavelength based on a differential value with respect to a reference spectral image, and correct a curvature of the reference spectral image based on the detected peak wavelength; and
a component analyzer configured to restore a spectrum by correcting a spectral image for analysis based on a correction result of the curvature of the reference spectral image, and analyze a component of an object based on the restored spectrum.

27. The apparatus of claim 26, wherein the image acquirer acquires the spectral image based on Raman spectroscopy.

28. The apparatus of claim 26, wherein the curvature corrector primarily and secondarily differentiates the spectrum for each row of the spectral image, and determines a point of the spectrum, at which a primary differential value is 0 and a secondary differential value is a negative number, as corresponding to the peak wavelength.

29. The apparatus of claim 26, wherein the curvature corrector calculates the curvature for the characteristic wavelength by using Ordinary Least Squares regression based on the peak wavelength detected for the characteristic wavelength, and corrects the curvature by performing interpolation of each pixel intensity value of the spectral image based on the calculated curvature.

30. The apparatus of claim 26, wherein the component analyzer determines whether to correct the spectral image based on an analysis result of the component, and provides guide information for correcting the spectral image to a user based on a determination of whether to correct the spectral image based on the analysis result of the component.

31. The apparatus of claim 26, wherein the component the object comprises at least one of blood glucose, degree of antioxidation, skin cancer, fine dust, triglycerides, calories, alcohol, cholesterol, proteins, and uric acid.

* * * * *